United States Patent Office 3,104,097
Patented Sept. 17, 1963

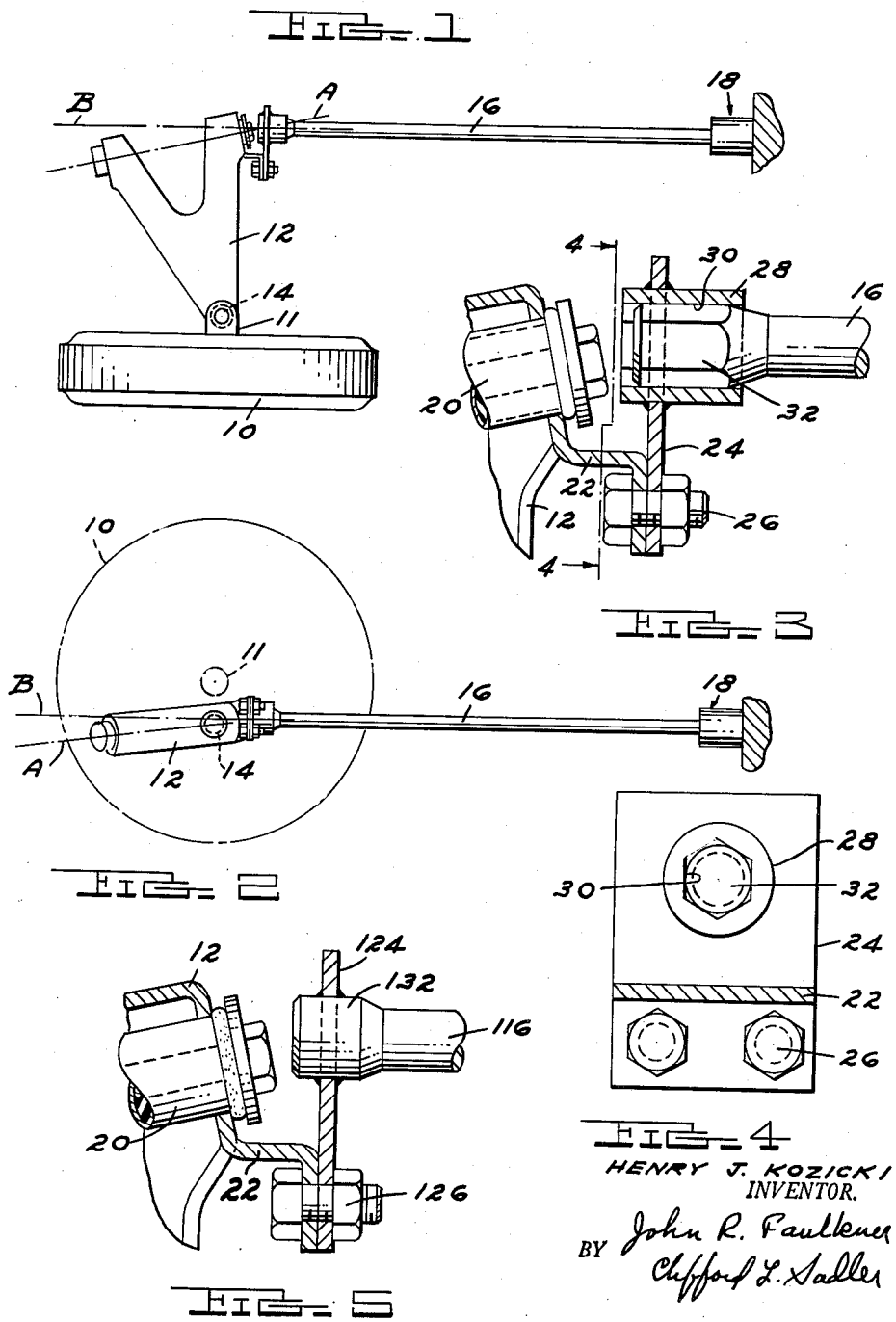

3,104,097
TORSION BAR MOUNTING CONSTRUCTION
Henry J. Kozicki, Orchard Lake, Mich., assignor to Ford Motor Company, Dearborn, Mich., a corporation of Delaware
Filed Aug. 17, 1961, Ser. No. 132,112
2 Claims. (Cl. 267—57)

This invention relates to torsion bar suspensions and more particularly to a method for connecting a torsion bar spring between sprung and unsprung components.

In some automotive suspension systems, torsion bar springs are secured to suspension arms and frame brackets by means of rigid attachment devcies. A typical example of such construction is provided by forming a spline or hexagonal shape on the end of a torsion bar and fitting the formed end into a socket of complementary contour. The bar has considerable torsional preload and the connection is usually inflexible. Where the attachment is rigid, the bar itself must bend or bow to allow the suspension arm to move in directions other than pure rotation about the center line of the bar.

For geometrical and space considerations, the center line of the suspension arm is usually offset at an angle to the center line of the torsion bar in both the plan and elevational views. As a result when the arm rotates about its pivot axis during vertical wheel travel, the bar must bend or bow. This is evident because the socket receiving the bar end is rotating about the pivot axis of the arm rather than about the center line of the bar.

In certain modern vehicle suspension systems, the wheel support structure is designed to have slight flexibility in a fore and aft direction to permit absorption of minor road shocks. This horizontal wheel movement is known as wheel compliance or wheel recession and results in a substantial reduction of harshness and improvement of ride. In a vehicle suspension system having compliance type construction, a rigid connection between the torsion bar end and the suspension arm will cause considerable resistance to the desired horizontal movement of the suspension arm. Thus, horizontal movement of the arm is compromised by the resistance of the bar to bending.

An additional objection to a rigid connection between the bar and the arm is that it tends to corrode and rust under the action of road salt, mud and similar contaminants. Such action leads to premature failure of the torsion bar and makes disassembly difficult.

In view of the present state of the art, it is an object of this invention to provide in a torsion bar suspension system an improved end mounting construction to eliminate the introduction of bending moments into the bar.

More specifically, the present invention provides a torsion bar end which is affixed to a leaf spring piece. The leaf spring in turn is bolted to a suspension arm bracket. When the arm oscillates during wheel travel, that part of the leaf spring attached to the arm oscillates about the arm center line and that part of the leaf spring attached to the torsion bar oscillates about the center line of the torsion bar. The leaf spring twists and bends to accommodate the non-parallelism of these two centerlines. Calculations show that the magnitude of these deflections is readily accommodated by conventional leaf spring stock within the allowable space of suspension design.

Therefore, it is one of the objects of the present invention to provide an attaching means for connecting a torsion bar to a suspension member having an intermediate leaf spring piece to permit misalignment of the torsion bar and the member to which it is attached.

These and other objects of this invention will be more fully comprehended from the following description and the accompanying drawings in which:

FIGURE 1 is a top plan view of a vehicle suspension system incorporating the present invention;
FIGURE 2 is a side elevational view of the suspension in FIGURE 1;
FIGURE 3 is an enlarged view of the torsion bar end mounting of FIGURE 1;
FIGURE 4 is a sectional view taken along section line 4—4 of FIGURE 3; and,
FIGURE 5 corresponds to FIGURE 3 and shows an alternate embodiment of the present invention.

Referring now to the drawings wherein like reference numerals identify like parts throughout the various views, FIGURE 1 presents an automotive type independent front suspension system having a vehicle wheel 10 rotatably mounted on a spindle 11 which in turn is secured to a pivotally mounted suspension arm 12 by a ball and socket joint 14 of well-known construction.

The inner end of the arm 12 is pivotally secured to a vehicle chassis (not shown) and has an axis of rotation indicated by the dash-dot line A. For purposes of the present discussion, the suspension arm 12 constitutes the lower arm of an independent suspension system, however, this invention is also appropriate to other instances where a torsion bar end is secured in position.

A torsion bar spring 16 is provided to elastically support the vehicle chassis on the wheel 10. The spring 16 is secured by a bracket assembly 18 to an appropriate component of the chassis, such as a cross-frame member. The forward end of the spring 16 is secured to arm 12 at the pivot 20 by a flexible connection to be described.

It is to be noted that the torsion bar 16 has a center line indicated by the dot-dash line B. In both the plan view, (FIGURE 1) and the side elevational view (FIGURE 2) the center line B of the torsion bar 16 does not coincide with the pivot axis A of the suspension arm 12. Such misalignment represents a typical suspension situation. As a result, a bending moment will be introduced into the bar 16 as the arm 12 oscillates about the axis A, that is, bending will be introduced unless appropriate means are provided. In accordance with the present invention, such means includes the construction detailed in FIGURE 3.

An angle-shaped bracket 22 is affixed to the suspension arm 12 at its pivot 20. A leaf spring member 24 is secured to the bracket 22 by appropriate means such as the threaded fasteners 26. One end of the leaf spring piece 24 has a central opening into which a hexagonal socket 28 is fitted and securely welded in place. The internal opening 30 of the socket 28 is reamed to have a hexagonal configuration.

The end of the torsion bar 16 is enlarged by upsetting and forged to have a hexagonal end portion 32 which nests within the hexagonal socket 30.

Thus the foregoing described construction provides a torsion bar spring which is secured to a pivotal member by means of an intermediate leaf spring stock. The leaf spring member is relatively flexible and is able to both twist and bend in order to accommodate misalignment of the pivotal member and the torsion bar spring. However, the leaf spring stock has rigidity in the plane of rotation of the torsion bar so that movement of the pivotal member will load the torsion bar in torsion only and not in bending.

FIGURE 5 discloses an alternate construction to that detailed in FIGURE 3. In FIGURE 5, the suspension arm 12 has a bracket 22 extending therefrom and located at the pivot 20. A leaf spring member 124 is bolted to the bracket 22. Instead of having a socket welded to the spring piece 24, the torsion bar end 132 is directly welded to the leaf spring stock. With this construction the assembly and disassembly of the torsion bar 116 is accommodated by means of the threaded fasteners 126. Besides certain manufacturing economies and piece cost savings, the construction of the torsion bar attachment in FIGURE 5 is functionally equivalent to that of FIGURE 3.

Other modifications and alterations of this invention may occur to those skilled in the art which will come within the scope and spirit of the following claims.

I claim:

1. A vehicle having a chassis member, a wheel support member and a suspension arm pivotally interconnecting said members, a torsion bar having one of its ends secured to said chassis member and the other of its ends disposed adjacent said suspensison arm, a flat spring member disposed in a plane perpendicular to said other end and secured thereto, said flat spring member having a portion connected to said suspension arm, said other end having an axis of rotation, said suspension arm having a pivot axis at its connection with said chassis member, said axes having a point of intersection at the approximate location of the plane of said spring member.

2. A vehicle having a chassis member, a wheel support member and a suspension arm pivotally interconnecting said members, a torsion bar having one of its ends secured to said chassis member and the other of its ends disposed adjacent said suspension arm, a flat spring member disposed in a plane perpendicular to said other end and secured thereto, said flat spring member having a portion connected to said suspension arm, said other end having an axis of rotation, said suspension arm having a pivot axis at its connection with said chassis member, said axes being inclined to one another.

References Cited in the file of this patent

UNITED STATES PATENTS

| | | |
|---|---|---|
| 2,621,058 | Montrose-Oster | Dec. 9, 1952 |
| 3,005,642 | Hertel | Oct. 24, 1961 |

FOREIGN PATENTS

| | | |
|---|---|---|
| 852,813 | France | Nov. 9, 1939 |
| 1,210,278 | France | Sept. 28, 1959 |

OTHER REFERENCES

German application 1,093,221, printed Nov. 17, 1960 (Kl. 63c40).